(No Model.)

M. F. LARSH.
GUIDE FOR BAND SAWS.

No. 365,441. Patented June 28, 1887.

Witnesses:
C. M. Stiles
R. H. Orwig

Inventor:
Mirenus F. Larsh,
By Thomas G. Orwig, Atty.

N. PETERS, Photo-Lithographer, Washington, D. C.

UNITED STATES PATENT OFFICE.

MIRENUS F. LARSH, OF DES MOINES, IOWA.

GUIDE FOR BAND-SAWS.

SPECIFICATION forming part of Letters Patent No. 365,441, dated June 28, 1887.

Application filed February 24, 1887. Serial No. 228,644. (No model.)

*To all whom it may concern:*

Be it known that I, MIRENUS F. LARSH, a citizen of the United States of America, and a resident of Des Moines, in the county of Polk and State of Iowa, have invented an Improved Guide for Band-Saws, of which the following is a specification.

My object is to provide a saw-guide that can be readily adjusted to suit different sizes of band-saws to prevent vibration and deviation from a straight line, as required, to produce smooth work and avoid the twisting, straining, and damaging of saws.

My invention consists in the construction and combination of a hub having a flange at its center and a bore through its axis, and two adjustable collars to produce a wheel, and in the combination of the wheel with a detachable and adjustable wheel-bearer and a frame, as hereinafter set forth, pointed out in my claims, and illustrated in the accompanying drawings, in which—

Figure 1:
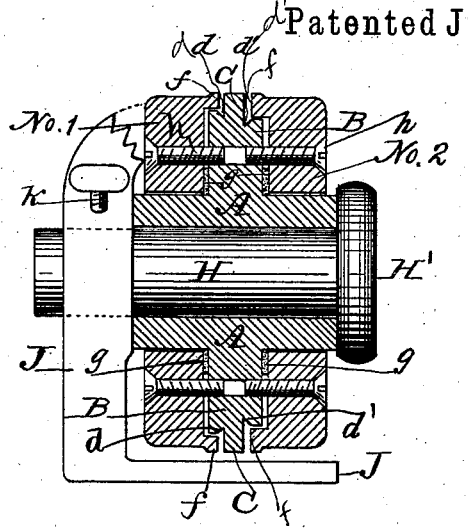
Figure 2:
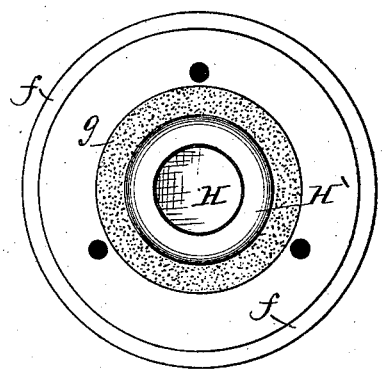
Figure 3:
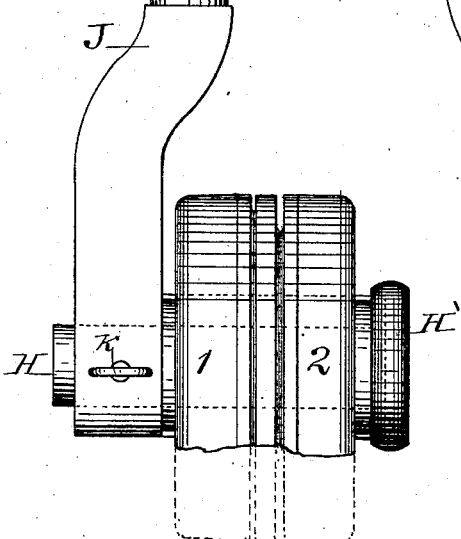

Figure 1 shows a half-section of my guide-wheel combined with an adjustable bearer and frame. Fig. 2 is an inside face view of one of the detachable collars placed upon the adjustable bearing and an elastic packing-ring placed around the central opening of the collar. Fig. 3 is a view showing the wheel, the bearing, and the frame combined and ready to be applied to a sawing-machine in a common way as required to allow the endless saw to pass through one of the continuous grooves in the periphery of the wheel.

A is the hollow hub, and B an integral circular flange at its center.

C is a minor flange on the center of the periphery of the flange B.

$d$ and $d'$ are V shaped continuous grooves of different width and depth at the opposite sides of the flange C.

No. 1 is a collar having a flange, $f$, at the circumference of its inside face that overlaps the flange B and extends toward the side face of the flange C. No. 2 is a corresponding collar adapted to be placed on the opposite sides of the flanges B and C, as clearly shown in Fig. 1.

$g$ $g$ are rubber packing-rings placed between the flanges B and the collars. Screws $h$ are inserted in coinciding perforations and screw-seats formed in the collars and flange in such a manner that the annular grooves in the periphery of the wheel can be readily widened or narrowed by simply operating the screws as required to suit saws of different thickness.

H is a detachable wheel-bearer in the form of a pin having a head, H', at one end fitted in the bore of the hub A, and a corresponding bore in a frame, J, as shown in Figs. 1 and 3, to be clamped fast in the frame by means of a set-screw, $k$.

The frame J, carrying the guide-wheel, having parallel continuous grooves in its periphery, is adjustably connected with the frame of a sawing-machine, as required, to bring the said parallel grooves in proper positions relative to different saws at different times. By simply reversing the position of the guide-wheel on its bearing H, the positions of the grooves are changed relative to the saw.

I claim as my invention—

1. The wheel composed of the hub A, having flanges B and C and grooves $d$ and $d'$, and collars Nos. 1 and 2, having flanges $f$, adjustably and detachably connected with the flanged hub A by means of screws and elastic packing, substantially as shown and described, for the purposes stated.

2. The combination of the hub A, having flanges B and C and grooves $d$ and $d'$, the collars Nos. 1 and 2, having flanges $f$, and the bearing H, having a head, H', for the purposes stated.

3. The improved saw-guide, comprising a flanged hub having continuous grooves in the periphery of its flange, collars having flanges projecting laterally from their circumferences, a bolt or bearing having a head and fitted in the bore of the hub, and a frame having a bore to admit the end of the said bolt or bearing, and a set-screw to clamp said bolt fast in the bore of said frame, constructed and combined to operate in the manner set forth.

MIRENUS F. LARSH.

Witnesses:
ROCKIE A. LARSH,
THOMAS G. ORWIG.